US012673861B2

(12) United States Patent
Nowacki et al.

(10) Patent No.: US 12,673,861 B2
(45) Date of Patent: Jul. 7, 2026

(54) SYSTEM AND METHOD FOR TRANSPORTING, FILLING AND CLOSING THE CONTAINERS

(71) Applicant: UNILOGO ROBOTICS SP. Z O.O., Piaseczno (PL)

(72) Inventors: Tomasz Nowacki, Warsaw (PL); Marcin Papiernik, Nowa Sucha (PL)

(73) Assignee: UNILOGO ROBOTICS SP. Z O.O., Piaseczno (PL)

( * ) Notice: Subject to any disclaimer, the term of this patent is extended or adjusted under 35 U.S.C. 154(b) by 0 days.

(21) Appl. No.: 19/102,851

(22) PCT Filed: Aug. 16, 2024

(86) PCT No.: PCT/EP2024/073155
§ 371 (c)(1),
(2) Date: Feb. 10, 2025

(87) PCT Pub. No.: WO2025/037031
PCT Pub. Date: Feb. 20, 2025

(65) Prior Publication Data
US 2026/0145924 A1 May 28, 2026

(30) Foreign Application Priority Data
Aug. 17, 2023 (EP) .................................... 23192045

(51) Int. Cl.
*B67C 3/24* (2006.01)
*B67C 7/00* (2006.01)

(52) U.S. Cl.
CPC ............ *B67C 3/242* (2013.01); *B67C 7/0026* (2013.01)

(58) Field of Classification Search
CPC .............................. B67C 3/242; B67C 7/0026
(Continued)

(56) References Cited

U.S. PATENT DOCUMENTS

2015/0197415 A1* 7/2015 Hahn ........................ B25J 11/00
414/226.02
2020/0407093 A1* 12/2020 Joplin ..................... B67B 3/206
(Continued)

FOREIGN PATENT DOCUMENTS

DE 102014102630 A1 8/2015
EP 3744649 B1 7/2021
(Continued)

OTHER PUBLICATIONS

JP-2004123181-A—English Translation (Year: 2004).*

*Primary Examiner* — Christopher M Afful
(74) *Attorney, Agent, or Firm* — Dickinson Wright PLLC; Andrew D. Dorisio; Nicholas P. Coleman

(57) ABSTRACT

A system for transporting, filling and closing containers (4) transported in an at least two rows comprising a placing section (11), a filling section (12) and a closing section (13), wherein it further comprises: an at least one magnetic linear transport line (3) extending through the placing section (11), the filing section (12) and the closing section (13); a plurality of transport carts (10) attached to the at least one magnetic linear transport line (3) configured to move along the at least one magnetic linear transport line (3); a plurality of holder pairs (1), wherein each of the holder pair (1) comprises a first holder (2*a*) and a second holder (2*b*), wherein each of the first holder (2*a*) and the second holder (2*b*) comprises a first end portion (8*a*) and a second end portion (8*b*), wherein at least the first end portion (8*a*) of the first holder (2*a*) is attached to the first transport cart (10) and at least the first end of the second holder (2*b*) is attached to the second transport cart (10) wherein each of the first end portion (8*a*) of each of the first holder (2*a*) and the second holder (2*b*) is attached to the different transport cart (10), wherein the first holder (2*a*) and the second holder (2*b*) comprise at least two first contact areas (5*a*) placed such, that the first contact areas (5*a*) of the first holder (2*a*) are facing toward the first contact areas (5*a*) of the second holder (2*b*), that is toward an inside of the holder pair (1); at least one automatic placing device (7), configured for placing the containers (4) between the holder pair (1), located in the placing section (11); wherein the filing section (12) is downstream of the placing section (11), wherein the filling section (12) com-
(Continued)

prises at least one filler unit (18) comprising at least two rows of at least one filler, configured to fill all rows of the containers (4) moved to the filling section (12), wherein the closing section (13) is downstream of the filling section (12), wherein the closing section (13) comprises at least two closing subsection (13*a*) and wherein each of the closing subsection (13*a*) comprising one row of at least one closing device (22) and wherein all closing devices (22) in each closing subsection (13*a*) are configured to put closure on one row of the containers (4), wherein each closing subsections (13*a*) is configured to put the closure on a different row of the containers (4).

19 Claims, 7 Drawing Sheets

(58) Field of Classification Search
USPC ................. 141/129; 198/468.5, 427.1, 803.6
See application file for complete search history.

(56) References Cited

U.S. PATENT DOCUMENTS

| | | | | |
|---|---|---|---|---|
| 2021/0008733 | A1* | 1/2021 | Nowacki | B25J 15/103 |
| 2022/0315356 | A1* | 10/2022 | Solà Gil | B65B 59/003 |

FOREIGN PATENT DOCUMENTS

| | | | | |
|---|---|---|---|---|
| JP | 2004123181 | A * | 4/2004 | B67B 3/206 |
| WO | 2006077050 | A1 | 7/2006 | |

* cited by examiner

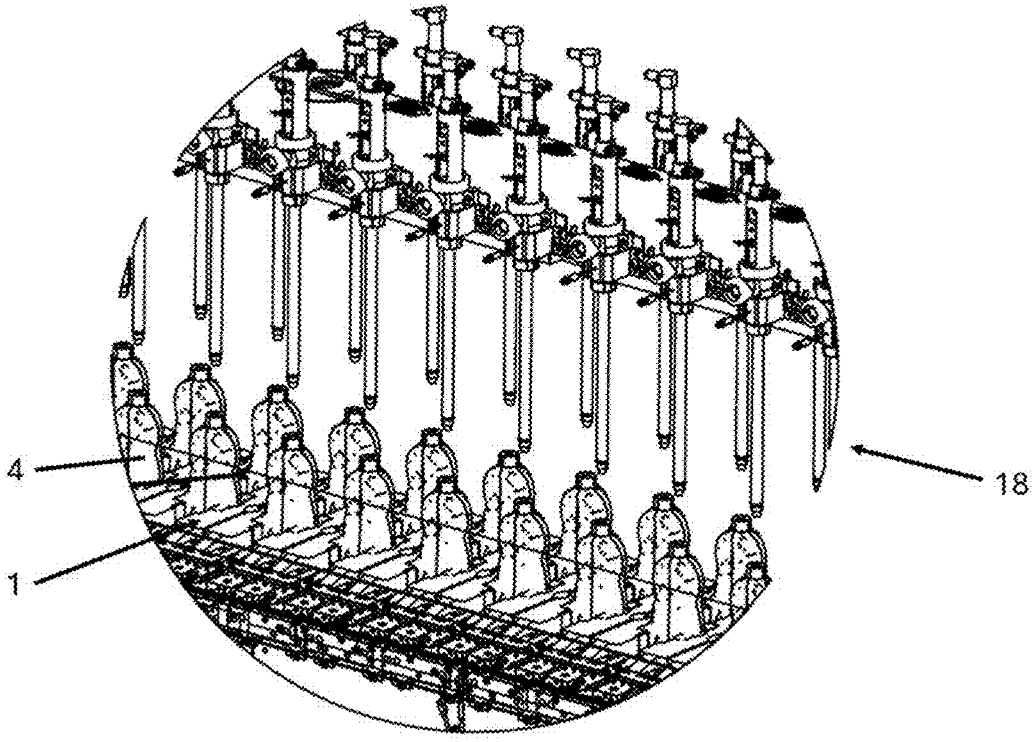
*Fig.* 9
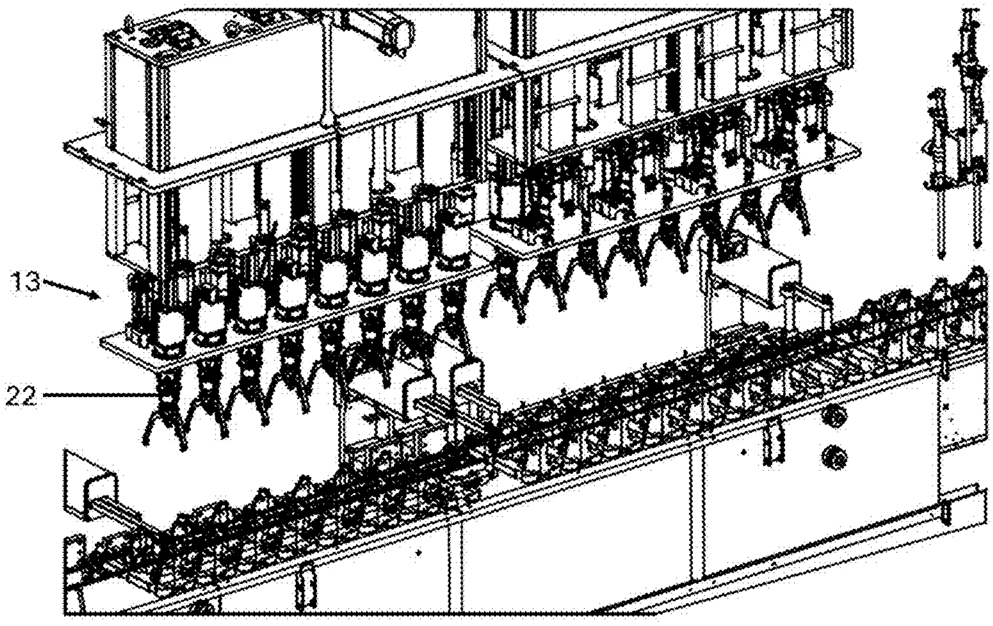
Fig. 10

SYSTEM AND METHOD FOR TRANSPORTING, FILLING AND CLOSING THE CONTAINERS

TECHNICAL FIELD

The present invention aims to provide an improved system for transporting, filling, and closing containers, specifically designed to enhance the efficiency of transport of the containers handled in the transport lines. Such system effectively multiplies the number of containers that can be transported, filled, and closed within a given transport line, thereby optimizing a space utilization and significantly improving throughput without the need for substantial increase of the used area.

PRIOR ART

Traditional linear transport lines systems are reliable but limited in their capacity, typically transporting only one product at a time. This limitation can lead to bottlenecks, especially in high-throughput environments. In linear systems improving capacity usually means extending the line in length proportionally. As an answer to that limitation came rotary systems, though capable of moving the containers quickly, are bulky and require significant space. They also demand extensive retooling time when product changes are needed, leading to production delays and increased costs.

This invention addresses the limitations present in existing container transport systems commonly used in industrial settings. Traditional mechanical conveyor systems are widely used for moving containers along fixed paths. However, these systems are typically limited to transporting a single products at a time or are not suitable for additional operations of filling and closing the products Rotary systems enable the fast transport of containers. Despite this advantage, rotary systems have significant drawbacks. They are complex and require a substantial amount of physical space. A major downside of rotary systems is the extensive retooling required when changing the type of containers being transported. Retooling involves partial disassembly and manual adjustments, which are both time-consuming and costly. This leads to production downtime and increased operational expenses, making rotary systems less desirable, especially in industries that frequently switch between different products.

Linear transport systems that handle only a single row of containers are also well-known. While these systems are effective for certain tasks, they start to be inefficient for certain production speeds. The costs are not proportional to the speed gain. Their inability to transport multiple containers simultaneously or quickly adapt to different product types limits their usefulness in settings that demand high throughput.

In summary, existing container transport systems each have significant limitations. These include the inability to scale the throughput in relation to space occupied, the large space requirements of rotary systems, and the costly, time-consuming retooling process when switching between different products.

SUMMARY OF INVENTION

According to the invention a system for transporting, filling and closing containers transported in an at least two rows comprising a placing section, a filling section and a closing section is disclosed. The system comprises: an at least one magnetic linear transport line extending through the placing section, the filing section and the closing section; a plurality of transport carts attached to the at least one magnetic linear transport line configured to move along the at least one magnetic linear transport line; a plurality of holder pairs, wherein each of the holder pair comprises a first holder and a second holder, wherein each of the first holder and the second holder comprises a first end portion and a second end portion, wherein at least the first end portion of the first holder is attached to the first transport cart and at least the first end of the second holder is attached to the second transport cart wherein each of the first end portion of each of the first holder and the second holder is attached to the different transport cart, wherein the first holder and the second holder comprise at least two first contact areas placed such, that the first contact areas of the first holder are facing toward the first contact areas of the second holder, that is toward an inside of the holder pair; at least one automatic placing device, configured for placing the containers between the holder pair, located in the placing section. The filing section is downstream of the placing section. The filling section comprises at least one filler unit comprising at least two rows of at least one filler, configured to fill all rows of the containers moved to the filling section. The closing section is downstream of the filling section. The closing section comprises at least two closing subsection and wherein each of the closing subsection comprising one row of at least one closing device and wherein all closing devices in each closing subsection are configured to put closure on one row of the containers. Wherein each closing subsections is configured to put the closure on a different row of the containers.

Preferably it comprises a base means extending through the placing section, the filling section and the closing section, configured for receiving the containers and allowing movement of at least one container due to movement of the holder pair.

Preferably the base means are in form of a conveyor or a slip surface.

Preferably the placing section comprises at least one placing area, preferably in the base means, configured to temporarily hold the container by means of a suction force, preferably the amount of the areas is equal or higher to the number of rows and for each row there is at least one placing area.

Preferably under the base means there is an at least one actuator configured for moving the base means to or away from the holder pairs.

Preferably the placing section and/or the filling section comprises at least one servomechanism configured to orientate the container, preferably each of the servomechanisms operates with each row of containers.

Preferably it comprises at least one sensor located in the placing section configured to determine the presence of one or more containers in the holder pair and/or to determine the presence of container in the automatic placing device.

Preferably the first holder and/or the second holder comprise at least two second contact areas located such that the second contact areas are facing an outward of the holder pair.

Preferably the first end portion and/or the second end portion of the first holder and/or the second holder comprises an attachment element in the form of a latch, magnet, plug, screw or other attachment element cooperating with a twin attachment element of the transport cart. Preferably the automatic placing device is an industrial robot, preferably it is a delta robot, scara robot or six-axis robot.

Preferably the senor is an infrared sensor, ultrasound sensor, mechanical sensor, vision sensor, touch sensor or weight sensor.

Preferably it further comprises at least one cleaning station for cleaning the filler unit, preferably there is the same number of the filler units and the cleaning stations.

Preferably comprises a depacking section which is downstream of the closing section, and wherein the depacking section comprises a depacking mechanism which is configured to rearrange the containers such that the containers form a singular row.

Preferably comprising holding means configured to secure the containers during the process of closing the containers.

Preferably the first holding areas 5*a* and/or second holding areas are separate elements configured to be mounted to the first holder and the second holder.

DESCRIPTION OF THE DRAWINGS

The invention will now be presented in more detail in a preferable embodiment, with reference to the attached drawings, in which:

FIG. 9 shows axonometric view of embodiment of filling section;

FIG. 10 shows axonometric view of embodiment of closing section;

DETAILED DESCRIPTION OF THE DISCLOSURE

Figure 1:
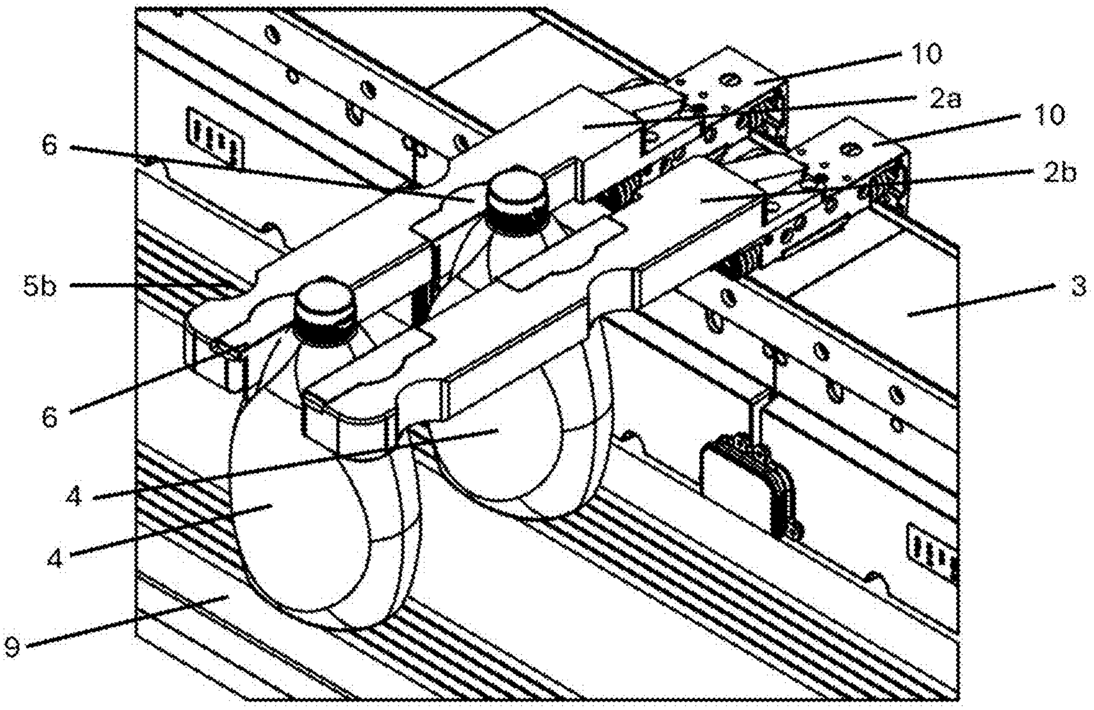
FIG. 1 shows axonometric view of embodiment of holder pair mounted on the magnetic linear transport line.
Figure 2:
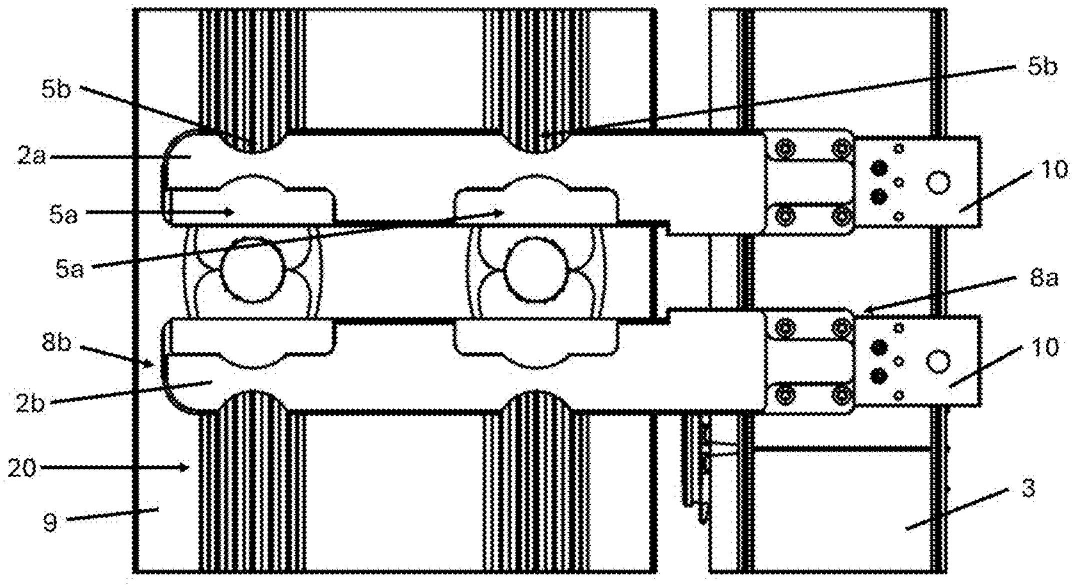
FIG. 2 shows the top view of holder pair holding two containers.
Figure 3:
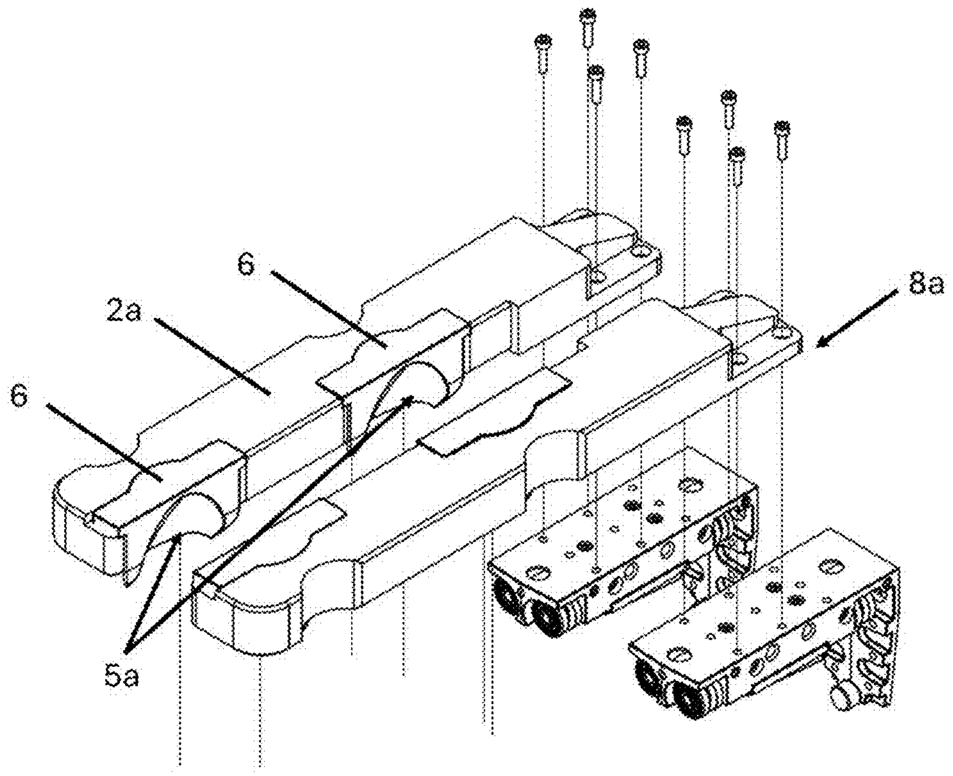
FIG. 3 shows embodiment of mounting method of holder pair to transport cart.
Figure 4:
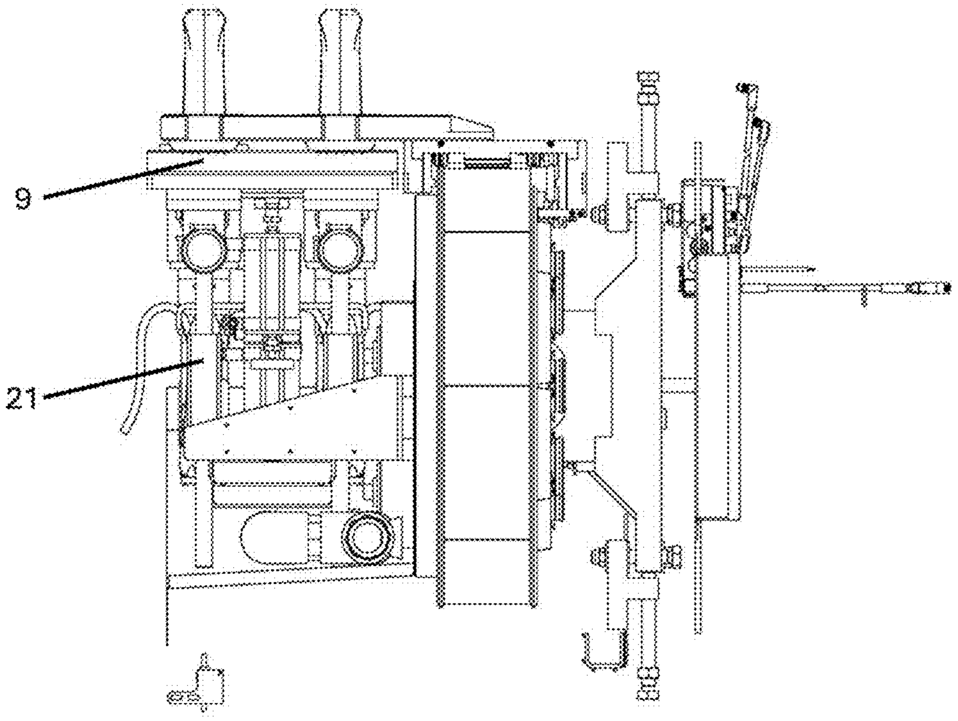
FIG. 4 shows embodiment of raising and lowering mechanism of base means.
Figure 5:
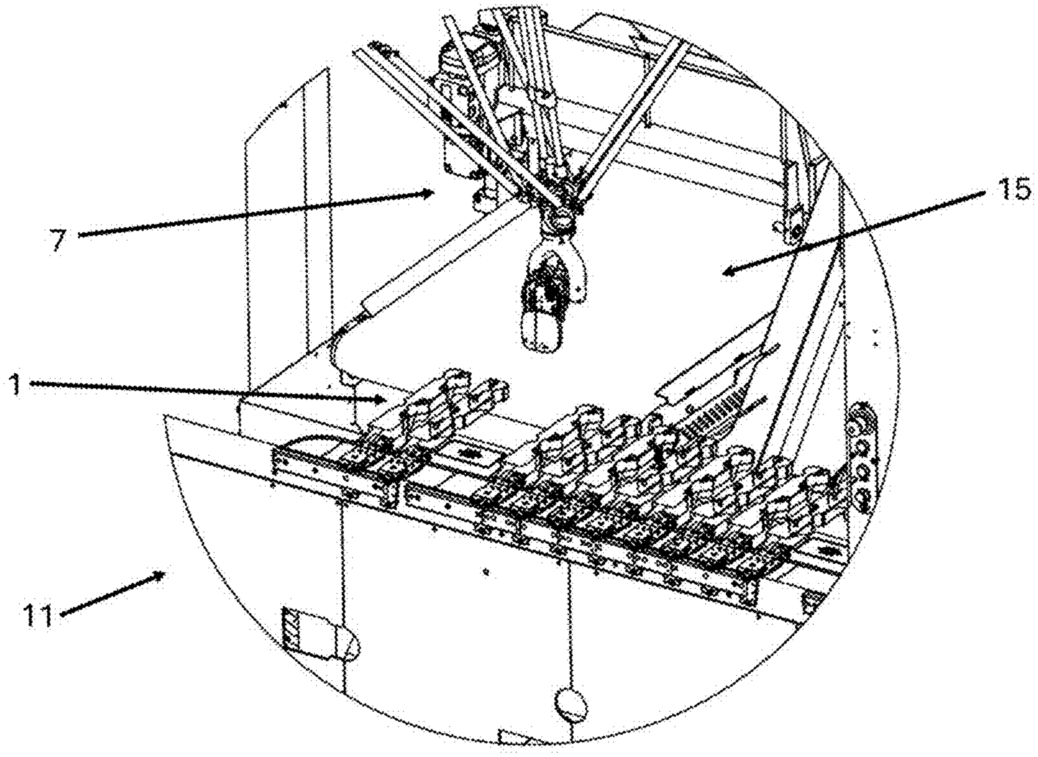
FIG. 5 shows axonometric view of embodiment of placing section.
Figure 6:
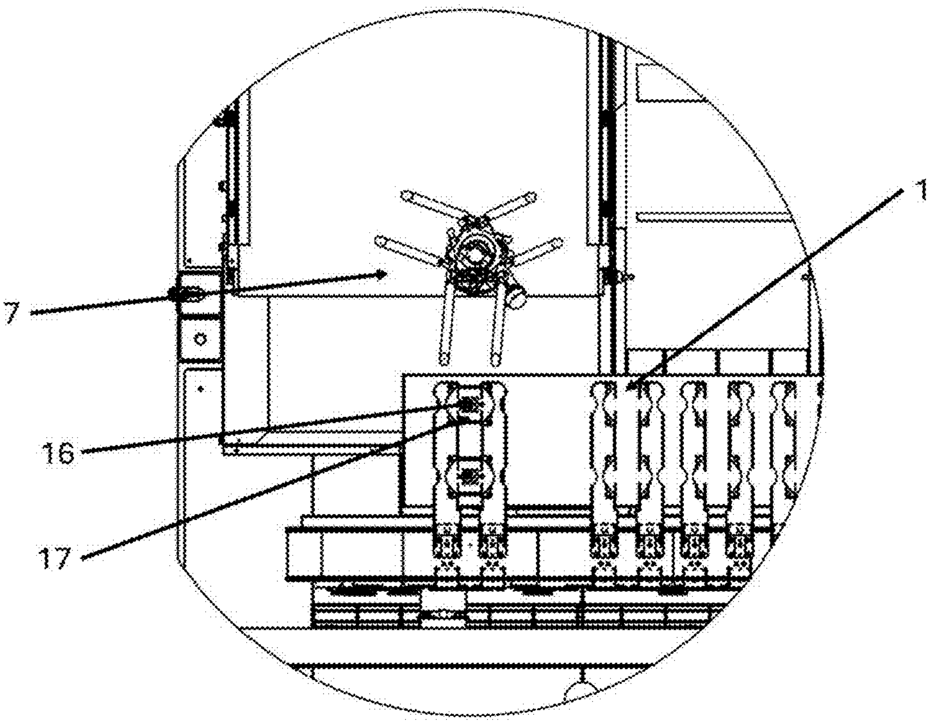
FIG. 6 shows top view of embodiment of placing section.
Figure 7:
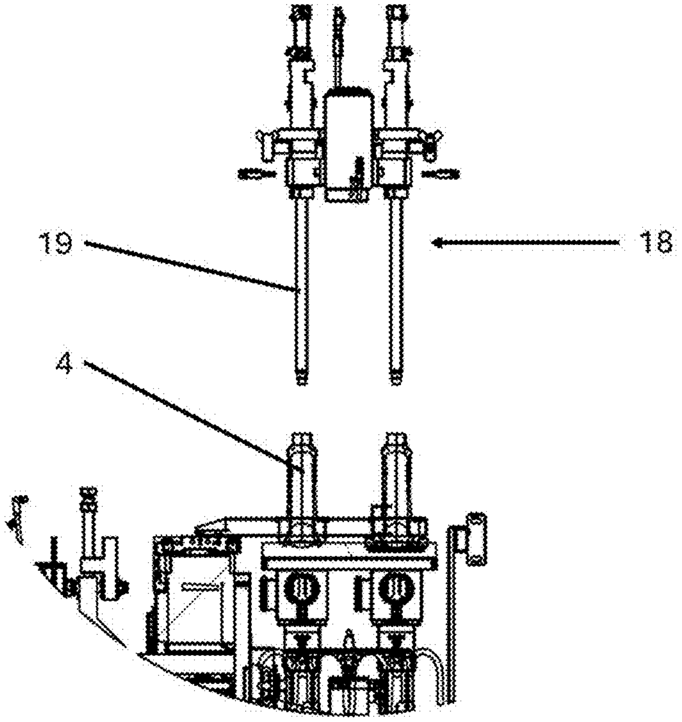
FIG. 7 shows cross-section through embodiment of filling section.
Figure 8:
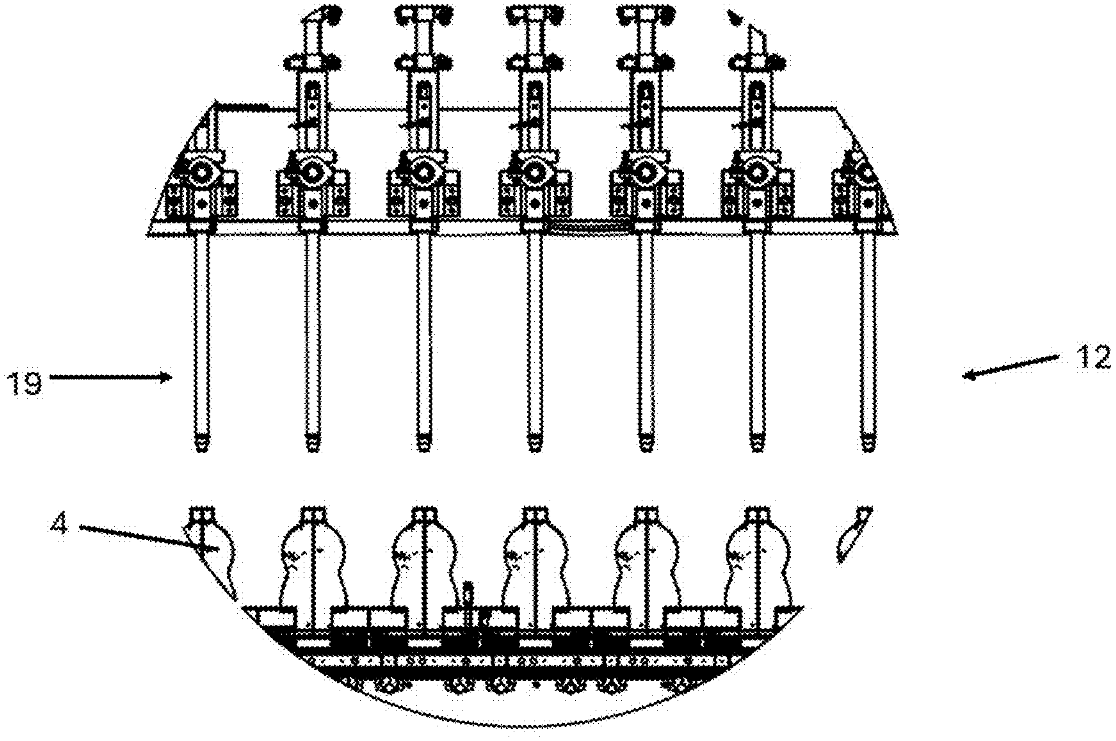
FIG. 8 shows side view of embodiment of filling section.
Figure 11:
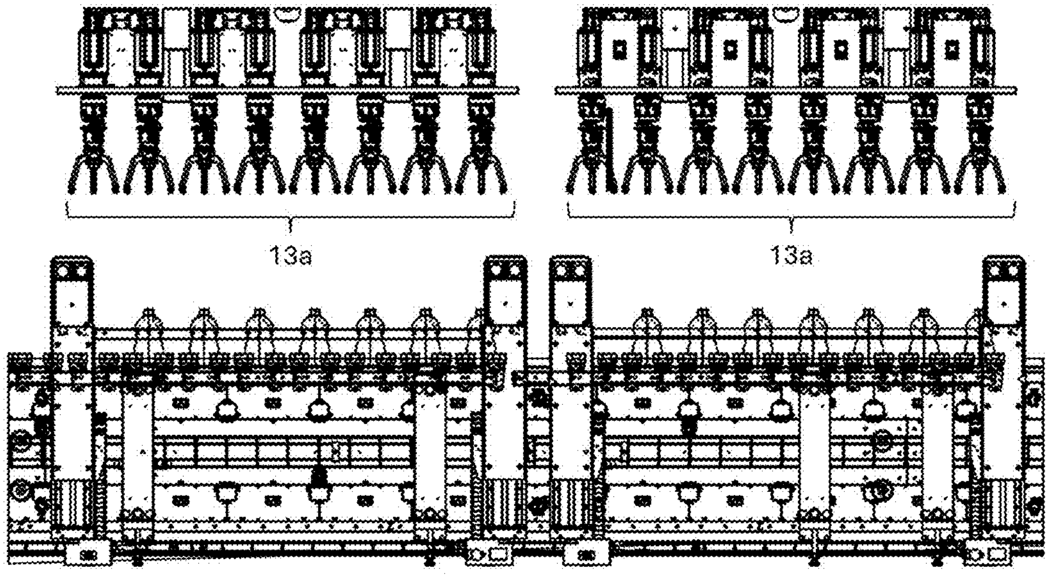
FIG. 11 shows side view of embodiment of closing section.
Figure 12:
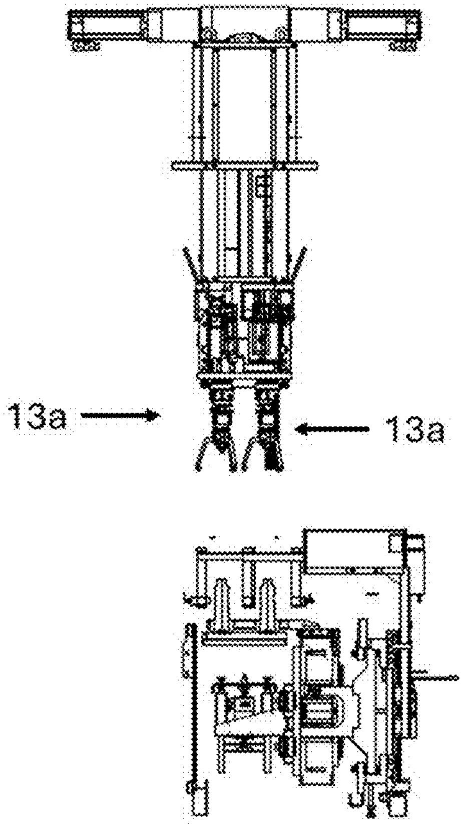
FIG. 12 shows cross-section of embodiment of closing section
Figure 13:
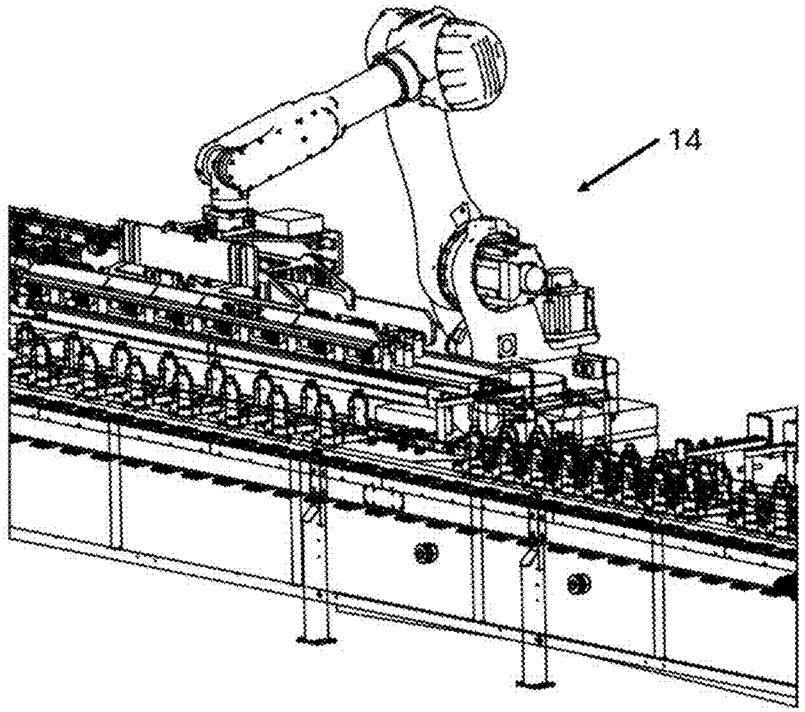
FIG. 13 shows axonometric view of embodiment of depacking section.
Figure 14:
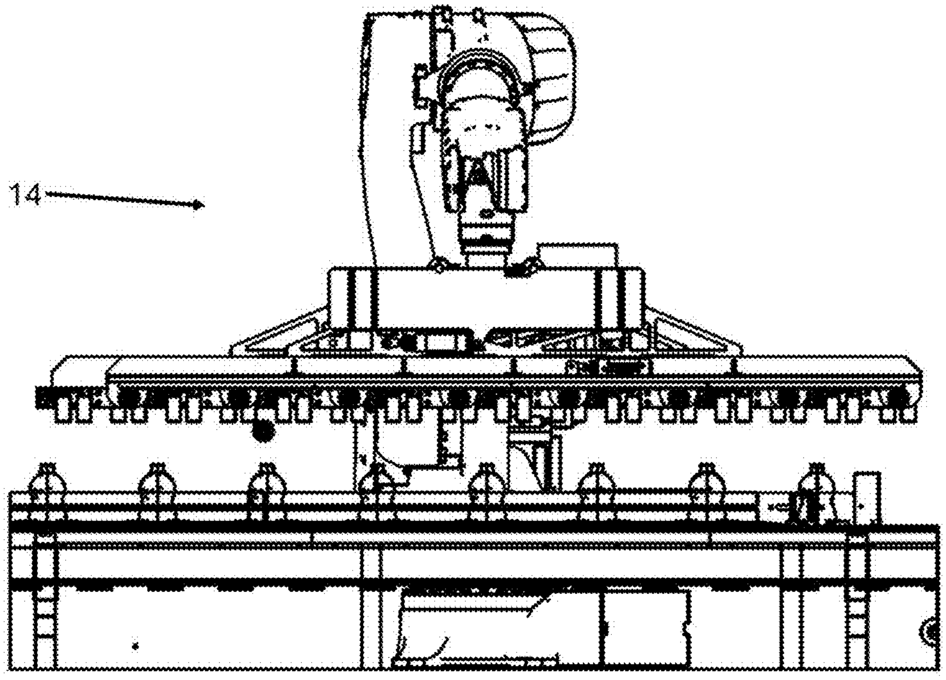
FIG. 14 shows side view of embodiment of depacking section.

The invention relates to a system for transporting, filling, and closing containers 4. By the containers 4 it is meant the typical product containers such as plastic or glass bottles etc.—the containers comprise some kind of closure and are preferably used to store cosmetics or personal hygiene products such as creams, shower gels, liquid soaps, body lotions, shampoos etc., as well as car care products (car cosmetics), containers for industrial chemistry, food chemistry, household chemicals products. The purpose of the system is to provide improved capacity of the transport line in the process that requires filling and closing the containers 4 whatever the product container 4 may be with only a limited extension of the whole production line.

The system comprises a placing section 11, a filling section 12, and a closing section 13. An at least one magnetic linear transport line 3 extends through the placing section 11, the filing section 12 and the closing section 13. Plurality of the transport carts 10 are attached to the magnetic linear transport line 3 configured to move along the magnetic linear transport line 3. Preferably the at least one magnetic linear transport line 3 comprises enough of the transport carts 10 to allow uninterrupted transport of the containers 4 without the need of delay caused by the transport carts 10 being occupied by the different sections. The system further comprises an at least one holder pair 1, wherein each holder pair 1 comprises a first holder 2*a* and a second holder 1. Each of the first holder 2*a* and the second holder 2*b* comprise a first end portion 8*a* and a second end portion 8*b*. At least the first end portion 8*a* of the first holder 2*a* is attached to the first transport cart 10 and at least the first end of the second holder 2*b* is attached to the second transport cart 10. It should be obvious however that the amount of transport carts 10 should be equal to the amount of the first holders 2*a* and the second holders 2*b* in order to allow for each of the first holder 2*a* and the second holder 2*b* to be attached to the different transport cart 10. The end portions of the first holder 2*a* and the second holder 2*b* can be shaped to define its connectivity to the transport cart 10, preventing incorrect assembly for example by using an asymmetrical shape of both the end portion and the transport cart 10 socket.

The first end portion 8*a* and/or the second end portion 8*b* can comprise an attachment element in the form of a latch, magnet, plug, screw, or other similar attachment element cooperating with a twin attachment element of the transport cart 10 securing both the holder pair 1 and the transport cart 10 together. Additionally, each of the first holder 2*a* and the second holder 2*b* comprise the at least two first contact areas 5*a* for receiving the containers 4 located on one side of the holder pair 1 in the linear fashion between the first end portion 8*a* and the second end portion. The first contact areas 5*a* should be placed on the inside of the holder pair 1 to allow the placement of the container 4 in the holder pair. According to one embodiment the holder pair 1 can comprise the at least one second contact area 5*b* located on the outside of the holder pair 1. In such case one holder pair 1 and another holder pair 1 placed next to each other would be able to transport the containers 4 between their second contact areas 5*b*. The first holder 2*a* and the second holder 2*b* used in the system should comprise the same amount of the first contact areas 5*a* for example the first holder 2*a* and the second holder 2*b* should both comprise two, three, four, or five first contact areas 5*a*. The contact areas can be designed as a part of the holder pair 1 in such case the contact area is inseparable part of the holder pair 1. According to another embodiment of invention the holder pair 1 can comprise the attachment means for attaching the removable contact areas 6 to the holder pairs, the benefit of such solution is the possibility to change the removable contact areas 6 without exchanging the holder pair 1.

The holder pairs 1 are preferably made of a deformable material made using additive technology. The first contact areas 5*a* with the plurality of the containers 4 arranged on the inner side of the holder pair 1 may have the same shape, but it is also possible that each of the first contact areas 5*a* or second contact areas 5*b* has a different shape adapted to two different shapes of containers 4. According to an another embodiment, the holder pair 1, in the contact area with the product 1, comprises an at least one element for fixing the transported container 4 with respect to the holder pair 1, preferably by an area with increased friction. Additionally other means such as a negative pressure may be use to additionally increase reliability and lower a placing time.

The system further comprises an at least one automatic placing device 7, located in the placing section 11, configured for placing the containers 4 in the holder pair in the placing area 16. The automatic placing device 7 can facilitate unscrambling of the containers 4 from an unscrambling area 15 in the placing section 11 where the containers 4 are left in unsorted manner placing them in the holder pair 1 or can be used to simply move the containers 4 from one designated area in the placing area 16 in between the first contact areas 5*a* or second contact areas 5*b* of the holder pair 1. The automatic placing device 7 can for example be an industrial robot, more preferably scara robot, 6-axis manipulator or delta robot. The list should not be treated as limiting as it should clear that the person skilled in art will recognize more types of industrial robots suitable for moving the containers 4 from one area of placing section 11 to the holder pair. The placing section 11 can further comprise a servomechanism used to orientate the containers 4 to the same direction. This is especially important if the system has unprecise automatic placing device 7 or in case of using asymmetrical containers 4, the servomechanism ensure the same position before the containers 4 are transported to the filing section preventing the accidental spilling in the filling section 12.

The goal of the present invention is to provide a system which is able to work with a different size containers 4. The placing section 11 is configured such that different shapes of containers 4 may be processed. The holder pair 1 is able to adapt quickly—in the best case scenario only a distance between the first holder 2*a* and the second holder 2*b* will change.

The system may also comprise base means 9 extending through the placing section 11, filling section 12 and closing section 13 and is configured for receiving the containers 4 and allowing the movement of the containers 4 due to movement of the holder pairs 1. The base means 9 can be for example a conveyor or a slip surface. In case of using the slip surface it is beneficial to use the low friction surface 20, for example surface with cut grooves which minimizes the contact area of the base means 9 with the containers 4. The base means 9 can further comprise one or more actuators 21 or other means used for moving the base means 9. Such embodiment facilitates the change of the containers 4 that are being transported through the magnetic linear transport line 3, ie when the tall containers 4 are to be transported, the base means 9 are lowered to allow contact of the container 4 base with the base means 9 and allow the correct placement of the containers 4 in the holder pair 1. In another example when the short containers 4 are to be transported the base means 9 are raised. The base means 9 does not move during the operation of the device, but it can be adjusted in height when another type of the containers, with a different geometrical shape and/or proportions, will be used.

An at least one sensor 17 may be located in the placing section 11 configured to determine the presence of one or more containers 4 in the holder pair 1 and/or in the automatic placing device 7. The sensor 17 allows the system to determine the presence of containers 4 in the holder pair 1. According to the solutions known in the prior art with just one set of contact areas the presence of containers 4 can be determined by the sensor 17 inside the holder pair 1, for example by the distance sensor 17 measuring the distance between the first holder 2*a* and second holder 2*b*. However, in case of the holder pairs 1 comprising at least two contact areas the presence cannot be determined so easily, since the presence of one container 4 would already cause the holder pairs 1 to be separated as in the case of two containers 4 in two contact areas. The sensor 17 facilitates the process of container 4 placement in the holder pair 1.

According to one embodiment for the holder pairs 1 with first contact areas 5*a*, the base means 9 include two meshes, preferably each comprising an infrared sensor 17. When the container 4 is placed by the automatic placing device 7 on the mesh the presence of the containers 4 can be detected by the sensor 17, and the information is sent back to the automatic placing device 7 allowing the automatic placing device 7 to place the next container 4 in the second contact areas 5*b* which the algorithm determined to be empty. When the presence of two containers 4 is detected, the containers 4 can be transported along the transport line and the next set of holder pairs 1 takes their place over the sensors 17 starting the process from the beginning. Such solution is only exemplary and other means for detecting the containers 4 can be used such as: weight sensor, ultrasound sensor, mechanical sensor, vision sensor, touch sensor or weight sensor. In the embodiment comprising the sensor 17 in the automatic placing device 7 the presence of the container 4 is determined only in the automatic placing device 7 and not in the holder pair 1. In such case the algorithm would require saving the information about placing the first container 4 in the first contact area 5*a* of the holder pair 1 and then grabbing the second container 4 and placing the second and any subsequent container 4 in the subsequent first contact areas 5*a*. One benefit of using the mesh in the placing area 16 is possibility to add suction device holding the containers 4 during placing the containers 4 in the holder pair 1, however it is possible to use the mesh in the base means 9 only for the suction device having the sensor 17 located in different area of the placing section 11. In yet another embodiment the sensor 17 is a vision sensor located above the transport lines configured to determine the presence of sensors 17 in the first contact areas 5*a* and/or second contact areas 5*b* of the holder pair 1.

Downstream of the placing section 11 the system comprises the filling section 12 which comprises an at least one filler unit 18 comprising at least two rows of at least one filler 19, configured to fill all rows of the containers 4 moved to the filling section 12. It is preferable to fill all the containers 4 at the same time however it is not required by the system to work. The filling section 12 should comprise at least one cleaning section for cleaning the filler unit 18 but preferably each of the filler units 18 should have its separate cleaning station. The use of separate cleaning stations facilitates change of the substance that is placed inside the containers 4. It is often that when changing the transport line to fill the same containers 4 with very differently colored of scented substances i.e. changing the substance from black to white it requires very thorough cleaning of each of the filler 19 that could take from several minutes to an hour. Including the cleaning stations for each of the filler units 18 speeds up the process significantly. In such case it is beneficial to keep the production running while the second filler unit 18 is being cleaned. It should be noted that cleaning process take some time (for example several dozen minutes) and thus having at least two filler units 18 with a dedicated cleaning station may save a lot of time, especially when the process will be change often.

Downstream of the filling section 12 the system comprises the closing section 13 comprising at least two closing subsections 13*a*. Each closing subsection 13*a* comprises one row of at least one closing device 22. All closing devices 22 in each closing subsection 13*a* are configured to put closure on one row of the containers, wherein in each closing subsections 13*a* put the closure on a different row of the containers. According to one embodiment of the invention the closing subsections 13*a* are translated in a way that the first row of containers 4 is closed by the first closing subsection 13*a* first, then the holder pairs 1 are moved to the second closing subsection 13*a* and the second closing subsection 13*a* is used to close the second row of containers 4. However, if the closing device 22 is a small enough all the closing subsections 13*a* can be located next to each other and closing all the container 4 rows at the same time. It should also be added that by closing the container 4 it is meant closing any typical kind of the product containers 4 by putting caps, flip top caps, disk-top caps, metal caps, push&pull caps or sealing the closure of the container. Additionally, the system can comprise the additional holding means which are used to secure the containers 4 during the process of closing the containers 4, removing the torque loads from the holder pairs 1.

Moreover, it is possible to double the magnetic linear transport line 3, in such embodiment the first end portion 8*a* of the holder pair 1 is attached to the first transport cart 10 on one side of the magnetic linear transport line 3 and the second end portion 8*b* of the holder pairs 1 is attached to the second transport cart 10 on the other side of the magnetic linear transport line 3. Such solution has benefits and drawbacks, the main benefit is achieving the greater stability of the holder pairs 1, the drawback is the need to double the magnetic linear transport lines 3 which requires more space.

Downstream of the closing section 13, the system may include a depacking section 14 featuring a mechanism to remove the containers 4 from the holder pairs 1 and reorganize them into a single row, simplifying the further transport, labelling, and packing of the containers 4 into the boxes further in the system. Reorganizing the containers 4 into single row is not mandatory it is easy to imagine a system which transports containers 4 into two separate rows, which would simplify the process of packing the containers 4 into the boxes.

The entire process of transporting the containers 4 through the system comprises following steps:

Picking one container 4 in the placing section 11 by the automatic placing device 7 and placing the container 4 between the first contact area 5*a* of the holder pair 1

Picking at least second container 4 in the placing section 11 by the automatic placing device 7 and placing the container 4 between the second contact area 5*b* of the holder pair 1

Transporting the containers 4 in holder pair 1.

According to one embodiment of the invention the process comprises additional steps:

filling all the rows of the containers 4, by the filler unit 18, simultaneously.

transporting the first row of the containers 4 and any of the subsequent rows of the containers 4 to the closing section 13 wherein the first row of containers 4 is closed by the first closing subsection 13*a* and wherein any of the subsequent rows of the containers 4 are closed by the closing subsections 13*a*.

According to another embodiment of the invention the method comprises following steps:

Setting the height of the base means 9 using the at least one actuator 21.

Picking one container 4 in a placing section 11 by the automatic placing device 7 and placing the container 4 between the first contact area 5*a* of the holder 1.

Using the suction area in placing area 16 to hold the first container 4 in place.

Detecting the presence of the container 4 between a first contact area 5*a* using the sensor Picking at least second container 4 in a placing section 11 by the automatic placing device 7 and placing the container 4 between the second and the subsequent contact areas of the holder pair 1.

Using the suction area to hold the second and subsequent container 4 in place.

Detecting the presence of the container 4 between the second and subsequent contact areas using the sensor 17.

Transporting the container 4 and orientating the first and any subsequent containers 4 using a servomechanism further.

Transporting the containers 4 to the filling section 12.

filling all the rows of the containers, by a filler unit 18, simultaneously.

transporting the first row of the containers 4 and any of the subsequent rows of the containers 4 to the closing section 13 wherein the first row of containers 4 is closed by the first closing subsection 13*a* and wherein any of the subsequent rows of the containers 4 are closed by the closing subsections 13*a*.

Transporting the containers 4 to the depacking section 14 and optionally joining them into the singular row.

Removing the containers 4 from the transport line

A person skilled in the art is familiar with possible modifications as well as available magnetic linear transport lines 3 and transport carts 10, and the examples given here and in the drawings are not intended to limit the scope of the invention, but only to present its preferred embodiment.

The system according to the invention allows for simultaneous transport of two or more containers 4 through one holder pair 1. The construction of the holder pairs 1 allows for minimizing the space occupied and increasing the throughput of the production line. Compared to a production line occupying the same space but using standard holders that can simultaneously transport only one product, the use of the holder pairs 1 according to the invention allowed for increasing the throughput by at least 60%.

LIST OF REFERENCE NUMERALS

1 holder pair
2*a* first holder
2*b* second holder
3 magnetic linear transport line
4 container
5*a* first contact areas
5*b* second contact areas
6 removable contact area
7 automatic placing device
8*a* first end portion
8*b* second end portion
9 base means
10 transport cart
11 placing section
12 filling section
13 closing section
13*a* closing subsection
14 depacking section
15 unscrambling area 16 placing area
17 sensor
18 filler unit
19 filler
20 low friction surface
21 actuator
22 closing device

The invention claimed is:

1. A system for transporting, filling and closing containers (4) transported in an at least two rows comprising a placing section (11), a filling section (12) and a closing section (13), wherein the system further comprises:

an at least one magnetic linear transport line (3) extending through the placing section (11), the filing section (12) and the closing section (13);

a plurality of transport carts (10) attached to the at least one magnetic linear transport line (3) configured to move along the at least one magnetic linear transport line (3);

a plurality of holder pairs (1), wherein each of the holder pair (1) comprises a first holder (2a) and a second holder (2b), wherein each of the first holder (2a) and the second holder (2b) comprises a first end portion (8a) and a second end portion (8b), wherein at least the first end portion (8a) of the first holder (2a) is attached to the first transport cart (10) and at least the first end of the second holder (2b) is attached to the second transport cart (10)

wherein each of the first end portion (8a) of each of the first holder (2a) and the second holder (2b) is attached to the different transport cart (10), wherein the first holder (2a) and the second holder (2b) comprise at least two first contact areas (5a) placed such, that the first contact areas (5a) of the first holder (2a) are facing toward the first contact areas (5a) of the second holder (2b), that is toward an inside of the holder pair (1);

at least one automatic placing device (7), configured for placing the containers (4) between the holder pair (1), located in the placing section (11);

wherein the filing section (12) is downstream of the placing section (11), wherein the filling section (12) comprises at least one filler unit (18) comprising at least two rows of at least one filler, configured to fill all rows of the containers (4) moved to the filling section (12), wherein the closing section (13) is downstream of the filling section (12), wherein the closing section (13) comprises at least two closing subsection (13a) and wherein each of the closing subsection (13a) comprising one row of at least one closing device (22) and wherein all closing devices (22) in each closing subsection (13a) are configured to put closure on one row of the containers (4), wherein each closing subsections (13a) is configured to put the closure on a different row of the containers (4).

2. The system according to claim 1, further comprising a base means (9) extending through the placing section (11), the filling section (12) and the closing section (13), configured for receiving the containers (4) and allowing movement of at least one container (4) due to movement of the holder pair (1).

3. The system according to claim 2, wherein the base means (9) are in form of a conveyor or a slip surface.

4. The system according claim 1, wherein the placing section (11) comprises at least one placing area (16), configured to temporarily hold the container (4) by means of a suction force.

5. The system according to claim 2, wherein under the base means (9) there is an at least one actuator (21) configured for moving the base means (9) to or away from the holder pairs (1).

6. The system according to claim 1, wherein the placing section (11) and/or the filling section (12) comprises at least one servomechanism configured to orientate the container (4).

7. The system according to claim 1, further comprising at least one sensor (17) located in the placing section (11) configured to determine the presence of one or more containers (4) in the holder pair (1) and/or to determine the presence of container (4) in the automatic placing device (7).

8. The system according to claim 1, wherein the first holder (2a) and/or the second holder (2b) comprise at least two second contact areas (5b) located such that the second contact areas (5b) are facing an outward of the holder pair (1).

9. The system according to claim 1, wherein the first end portion (8a) and/or the second end portion (8b) of the first holder (2a) and/or the second holder (2b) comprises an attachment element in the form of a latch, magnet, plug, screw or other attachment element cooperating with a twin attachment element of the transport cart (10).

10. The system according to claim 1, wherein the automatic placing device (7) is an industrial robot.

11. The system according to claim 1, wherein the senor (17) is an infrared sensor, ultrasound sensor, mechanical sensor, vision sensor, touch sensor or weight sensor.

12. The system according to claim 1, further comprising at least one cleaning station for cleaning the filler unit (18).

13. The system according to claim 1, comprising a depacking section (14) which is downstream of the closing section, and wherein the depacking section (14) comprises a depacking mechanism which is configured to rearrange the containers (4) such that the containers forma singular row.

14. The system according to claim 1, comprising holding means configured to secure the containers (4) during the process of closing the containers (4).

15. The system according to claim 1, wherein the first holding areas (5a) and/or second holding areas (5b) are separate elements configured to be mounted to the first holder (2a) and the second holder (2b).

16. The system according to claim 4, wherein an amount of the areas is equal or higher than the number of rows, and wherein for each row there is at least one placing area (16).

17. The system according to claim 6, wherein each of the servomechanisms operates with each row of containers (4).

18. The system according to claim 10, wherein the industrial robot is a delta robot, SCARA robot, or six-axis robot.

19. The system according to claim 12, wherein the number of filler units (18) and cleaning stations are the same.

* * * * *